Nov. 25, 1941. E. W. FISHER, JR., ET AL 2,264,148
MACHINERY PACKING
Filed June 6, 1940
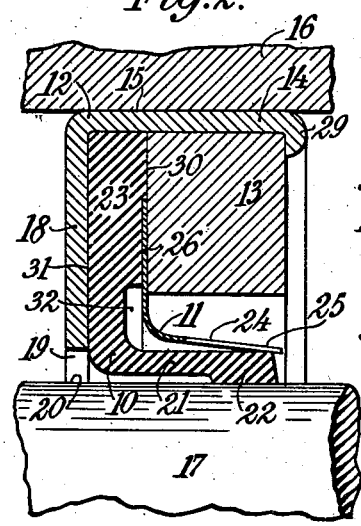
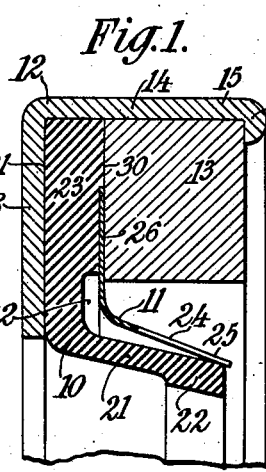
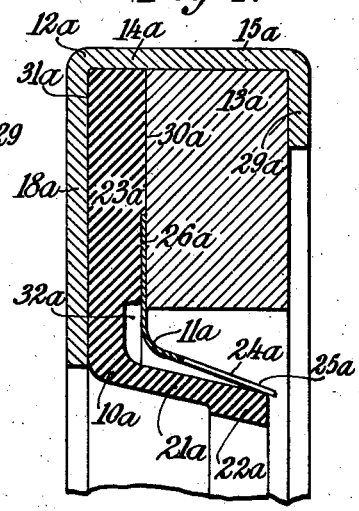
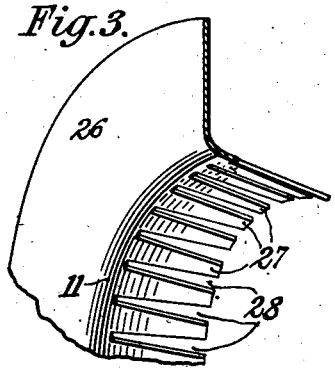
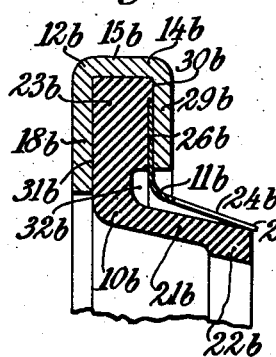
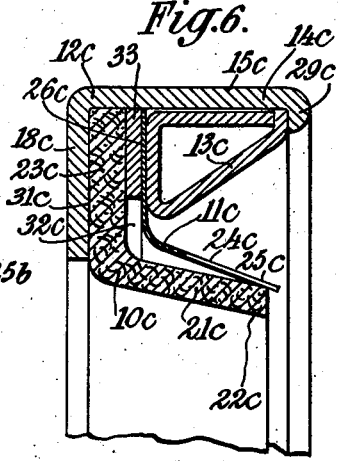
INVENTORS:
Edward W. Fisher, Jr.
and William H. Gudinas,
BY Fraser, Myers & Manley,
ATTORNEYS.

Patented Nov. 25, 1941

2,264,148

UNITED STATES PATENT OFFICE 2,264,148

MACHINERY PACKING

Edward W. Fisher, Jr., and William H. Gudinas, Palmyra, N. Y., assignors to The Garlock Packing Company, Palmyra, N. Y., a corporation of New York Application June 6, 1940, Serial No. 339,122

8 Claims. (Cl. 288—3)

This invention relates to improvements in machinery packings, and is particularly adapted for use as means for sealing an annular space between a rotatable shaft and its housing or between other analogous relatively movable machine elements.

An important object of the invention is to provide a sealing device comprising a metal shell, a flexible sealing element, a spring and clamping means, the parts being of relative forms and dimensions such that, when the sealing element and spring are clamped in their assembled relation with the shell, the deformation of the compressed part of the flexible sealing element will not result in a disturbance of the intended adjustment of closely associated parts of the sealing element and the spring.

In the accompanying drawing illustrating various preferred forms of the invention—

Figure 1 represents in cross section a part of a sealing device of the above-described character which is especially adapted for use when the sealing element is constructed of rubber composition or of material of analogous physical characteristics.

Fig. 2 is a cross section intended to illustrate changes of form of parts of the device represented by Fig. 1 when applied to a shaft with which the sealing element is designed to be assembled.

Fig. 3 is a perspective view of a fragmentary portion of a spring adapted for use as a part of the device illustrated by Figs. 1 and 2.

Fig. 4 is a cross-sectional view of a sealing device of modified form differing from that illustrated by Fig. 1 essentially in that it is of materially greater radial depth.

Fig. 5 is a cross-sectional view of another modified form which differs from the seal illustrated by Fig. 1 in that the sealing element and spring are assembled with the shell without reliance upon an additional clamping ring.

Fig. 6 is a cross-sectional view of another modified form of the device particularly adapted for use when the sealing element is made of leather as distinguished from rubber composition or equivalent material.

The form of the invention illustrated by Figs. 1, 2 and 3, which will first be described, consists in general of a flexible sealing element 10 and a spring 11 mounted in a metal shell 12 by means of a clamping ring 13.

The metal shell may preferably be in the form of a cup-shaped element having an annular, cylindrical portion 14 with an outer, cylindrical surface 15 to be mounted in fluid-tight contact with the inner surface of a housing 16 surrounding a shaft 17 with which the sealing device is intended to be assembled, as indicated in Fig. 2.

The cylindrical element 14 of the shell may be provided at one of its margins with an inwardly disposed flange 18 of dimensions such as to provide a working clearance 19 between its inner margin and the outer surface 20 of the shaft 17.

The sealing element 10 may preferably consist of a sleeve-like portion 21 adapted to extend along a part of the shaft to be surrounded by the shell. The sleeve-like portion may have at one of its margins a terminal lip 22 adapted to be held in fluid-tight contact with the shaft 17, and may have at its opposite margin an outwardly disposed flange 23 adapted to be held in fluid-tight contact with, and backed up by, the flange 18 of the shell.

The dimensions of the sleeve 21 and lip 22 of the sealing element may be such that they will have to be expanded when the sealing device is assembled with the shaft with which it is designed to be used, as will be apparent from a comparison of Figs. 1 and 2 of the drawing.

The spring 11, which is intended to maintain the lip 22 of the sealing device in snug contact with the surface 20 of the shaft 17, may consist of a conical portion 24 so positioned with respect to the sealing element that one of its marginal portions 25 may encircle the lip 22, and the said conical portion of the spring may have at its opposite margin an outwardly disposed flange 26 by which it may be held in an assembled relation with other parts of the seal.

The marginal portion 25 of the spring which surrounds the lip will preferably be made flexible by dividing it into a circumferential series of fingers 27, as by means of a succession of spaced incisions 28 which may be extended along any appropriate portion of its conical element (see Fig. 3) and, if desired, into and part way across its marginal flange 26. The dimensions of the spring and the inclination of its conical portion may be such that the fingers will make contact with the lip of the sealing element at their ends only, so as to hold the lip of the sealing element in its sealing relation with the shaft.

In the form of the invention illustrated by Figs. 1, 2 and 3, the sealing element 10, its spring 11 and the clamping element 13 are held in their assembled relation with the shell 12 in a state of compression between the flange 18 of the shell and a lip 29 turned inwardly from the margin of the cylindrical element 14 opposite the flanged margin which backs the flange of the sealing element. The clamping ring 13 serves as a spacing ring which is backed at one margin against the inturned lip 29 of the shell and the opposite face 30 of which is caused to press the flange 26 of the spring and the flange 23 of the sealing element in a fixed relation with respect to the shell, with the surface 31 of the flange of the sealing element in a fluid-tight contact with the opposed surface of the flange 18 of the shell.

In order that the compression of the parts which are assembled in the shell, which is of a degree sufficient to firmly clamp them between the flange and the lip of the shell, may not cause the compressed material of the flange of the sealing element to flow into the space between the shell and the portions of the spring where its conical element merges with its flange and thereby disturb the intended relation of adjustment between the spring and the lip of the sealing element, the portion of the flange 23 of the sealing element which is subjected to compression is made of a greater thickness than the remainder of the sealing element, thus providing a space 32 extending from the inner margin of the area of compression to a point well beyond the merger of the conical element with the flange. The provision of this space, which is of primary importance as a feature of the invention, permits the compressed material of the relatively thick part of the flange of the sealing element, when deformed, to readjust itself without exerting any unintended pressure upon the portion of the spring which extends below the clamping means such as would in any manner disturb the designed relation between the spring and the lip of the sealing element.

The form of the invention illustrated by Fig. 4 differs essentially from that illustrated by Figs. 1, 2 and 3 in that the sealing device is of relatively greater radial depth. The various parts of this modified form of the invention are designated by reference characters conforming with those which designate corresponding parts of the form illustrated by Figs. 1, 2 and 3, with the letter $a$ added in each instance.

It will be noted that the widths of the flanges 23a, 26a and 18a of the sealing element, spring and shell, respectively, are of increased widths conforming with the increased radial dimension of the seal, and that the lip 29a is also of material radial depth as compared with the lip 29 of the form of the invention illustrated by Fig. 1, in order to afford a substantial backing for the relatively deep spacer ring 13a relied upon to clamp the spring and sealing element in the shell.

The form of the invention illustrated by Fig. 5 differs from the forms hereinbefore described in that it omits the clamping ring 13a. In his form of the invention the flange 23b of the sealing element 10b and the flange 26b of the spring 11b are clamped directly between the flange 18b and the inturned lip 29b of the shell 12b, the lip 29b being of a radial depth equal to the desired radial dimension of the area of compression to be established between the parts of the device to be clamped between the flange and the lip.

Other parts of the sealing device illustrated by Fig. 5 have been designated by reference characters conforming with those used to designate corresponding parts of the form of the invention illustrated by Figs. 1, 2 and 3, except that the letter $b$ has been added in each instance. No detailed description of these additional parts would seem to be called for.

The form of the invention illustrated by Fig. 6 is one which is especially adapted for use when the sealing element is to be made of leather, in which case it is desirable to avoid the necessity of providing that element with a flange of materially greater thickness than that of the sleeve and lip. The parts of the form of the invention illustrated by Fig. 6 have been designated by reference characters conforming with those used to designate analogous parts of the form represented by Figs. 1, 2 and 3, except that the letter $c$ has been added in each instance. It will be unnecessary to refer to features of this form of the invention other than those which differ materially from those of the form illustrated by Fig. 1.

In this form of the invention it will be observed that the flange 23c of the sealing element 10c is of uniform width throughout and that the space 32c between the sealing element and the spring 11c is provided by inserting a relatively thin, perforated, spacing disk 33 between said parts. This disk may be made of any material capable of withstanding the pressure to be exerted in order to clamp the parts of the device in their assembled relation.

If desired, the flange 26c of the spring 11c may be of radial dimensions such as to extend to the inner surface of the cylindrical element 14c of the shell, thereby completely separating the clamping ring 13c from the spacer ring 33.

Also, if desired, the clamping ring 13c may be in the form of a hollow sheet-metal ring of triangular form in cross section as indicated, instead of being a solid ring such as the ring 13 of the form shown in Fig. 1.

It will be apparent that either the hollow sheet-metal ring or the solid ring may be used, at the election of the designer, in any of the forms of the invention herein disclosed. It will also be apparent that rings such as those designated 13 and 13a in Figs. 1 and 4 may either be of metal or other rigid material, or may be of rubber composition or similar material of a character adapted to withstand the pressure to which they must be subjected in order to clamp the various parts to be assembled with the shell.

The springs used as parts of the sealing devices represented by Figs. 4, 5 and 6, respectively, may conform in every substantial respect with the one illustrated by Fig. 3 as a part of the device shown in Figs. 1 and 2.

The forms of the invention illustrated by Figs. 4, 5 and 6 may be such that the sleeve and the lip of the sealing element may have to be expanded in order to assemble them with the shaft with which they are designed to cooperate in conformity with the corresponding feature of the seal represented by Fig. 1, the expanded form of which is indicated by Fig. 2.

It will be observed that the effective sealing portion 22c of the leather sealing element of the form of the invention illustrated by Fig. 6 is not a protruding portion, as in the case of the elements 22, 22a and 22b of forms previously described. As to the form illustrated by Fig. 6, all that is essential is that the dimensions of the sealing element be such that, when expanded so as to encircle the shaft with which it is to be assembled, the marginal portion of the sleeve 21c will be bent to an extent such that a zone 22c of material width along the margin of the sleeve may be held in close contact with the shaft.

The invention is not intended to be limited to the specific forms which have been selected for purposes of illustration, but should be regarded as including modifications and variations thereof within the scope of the appended claims.

What is claimed is:

1. A device adapted to seal the space between a shaft and its housing; said device comprising a metal shell to be mounted fluid-tight in the housing and having an inwardly disposed marginal flange of dimensions such as to clear the shaft; a flexible sealing element having a sleeve to extend along a part of the shaft to be surrounded by the shell, said sleeve terminating at one margin in a lip to be held in contact with the shaft and having at its opposite margin an outwardly disposed flange backed against the flange of the shell; means comprising a spring for maintaining the lip of the sealing element in its sealing relation with the shaft, said spring having a thin, radially extending, annular portion by which it may be held in its assembled relation with other parts of the device; and means, comprising an inturned lip on the margin of the shell opposite that which backs the flange of the sealing element, by which the flange of the sealing element and the outer annular portion of its spring may be clamped in a state of compression between said lip and said flange, the portions of the adjacent annular surfaces of the sealing element and its spring, extending from the inner margins of the compressed areas of the mutually contacting radial surfaces of the flange of the sealing element and the opposed part of the spring to the flange supporting end of the sleeve of the sealing element and closely neighboring part of the spring, being separated sufficiently to provide ample space to accommodate any deformation of the surface portion of the sealing element lying along the zone of separation which may be caused by its compression, and thereby prevent possible resultant crowding of the opposed portion of the spring such as might disturb its designed relation of adjustment with respect to the lip of the sealing element.

2. The device defined by claim 1, of which the face of the outwardly disposed flange of the sealing element which is opposed by the spring is recessed so as to abruptly reduce its thickness along the inner margin of the area subjected to pressure and throughout an area extending to and within the zone of merger of its sleeve with said flange.

3. The device defined by claim 1, of which the means for clamping parts of the assembly between the lip and flange of the shell includes a spacing ring held in a state of compression between said lip and other of the said parts to be clamped.

4. The device defined by claim 1, of which the means for clamping parts of the assembly between the lip and flange of the shell includes a spacing ring held in a state of compression between said lip and other of the said parts to be clamped, and of which the said lip and the adjoining surface of the spacing ring with which it makes contact are of material radial dimensions so that the lip may serve as an effective backing for an area of the ring of material radial depth.

5. The device defined by claim 1, of which the means for clamping parts of the assembly between the lip and flange of the shell includes a sheet-metal spacing ring of triangular form in cross section held in a state of compression between said lip and other of the said parts to be clamped, the said ring having a cylindrical surface to make contact with the surrounding wall of the shell and a plane surface to serve as an abutment for the adjacent element of the assembly against which it is clamped.

6. The device defined by claim 1, having a spacing ring, interposed between the flange of the sealing element and the opposed portion of its spring, of radial dimensions conforming approximately with those of the designed areas of compression between the radial surfaces of the parts of the assembly clamped between the lip and flange of the shell.

7. The device defined by claim 1, of which the means for clamping parts of the assembly between the lip and flange of the shell includes a spacing ring interposed between the flange of the sealing element and its spring and a second spacing ring held in a state of compression between the spring and the lip, the said spacing rings having clamping surfaces of radial dimensions conforming approximately with those of the designed areas of compression between the clamped parts.

8. The device defined by claim 1, of which the inturned marginal lip of the shell is in direct surface contact with a radially-disposed portion of the spring and is of a radial depth such that its inner margin conforms substantially with the inner margins of the compressed areas of the contacting radial surfaces of parts of the assembly clamped between said lip and the opposed flange of the shell.

EDWARD W. FISHER, Jr.
WILLIAM H. GUDINAS.